United States Patent
Jung et al.

(10) Patent No.: US 10,826,341 B2
(45) Date of Patent: Nov. 3, 2020

(54) ROTOR OF MOTOR APPARATUS

(71) Applicant: HYUNDAI MOBIS Co., Ltd., Seoul (KR)

(72) Inventors: Jae Woo Jung, Daegu (KR); Hyung Il Park, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 170 days.

(21) Appl. No.: 16/055,150

(22) Filed: Aug. 6, 2018

(65) Prior Publication Data

US 2019/0140502 A1 May 9, 2019

(30) Foreign Application Priority Data

Nov. 7, 2017 (KR) .................. 10-2017-0147161

(51) Int. Cl.
*H02K 1/28* (2006.01)
*H02K 1/27* (2006.01)
*H02K 7/00* (2006.01)
*H02K 15/03* (2006.01)

(52) U.S. Cl.
CPC ............. *H02K 1/2773* (2013.01); *H02K 1/28* (2013.01); *H02K 7/003* (2013.01); *H02K 15/03* (2013.01)

(58) Field of Classification Search
CPC ......... H02K 1/2773; H02K 1/276; H02K 1/28
See application file for complete search history.

(56) References Cited

U.S. PATENT DOCUMENTS

| 5,786,650 A * | 7/1998 | Uchida ............... H02K 1/2773 310/156.55 |
| 5,955,807 A * | 9/1999 | Kajiura ................. H02K 29/12 310/156.66 |
| 8,519,588 B2 * | 8/2013 | Amrhein ............... H02K 1/276 310/156.56 |
| 9,391,479 B2 | 7/2016 | Hong et al. |
| 2014/0103771 A1 * | 4/2014 | Figgins .................... H02K 1/28 310/156.15 |
| 2014/0103772 A1 * | 4/2014 | Kingrey ................ H02K 15/03 310/156.15 |
| 2015/0028710 A1 * | 1/2015 | Oka ..................... H02K 1/2773 310/156.48 |
| 2018/0048200 A1 * | 2/2018 | Jang .................... H02K 1/2773 |

FOREIGN PATENT DOCUMENTS

| CN | 104335454 | 2/2015 |
| JP | 2017-169402 | 9/2017 |
| KR | 10-2012-0110275 | 10/2012 |
| KR | 10-2015-0009552 | 1/2015 |
| KR | 10-2016-0120067 | 10/2016 |
| KR | 10-2016-0132512 | 11/2016 |

* cited by examiner

*Primary Examiner* — Dang D Le
(74) *Attorney, Agent, or Firm* — H.C. Park & Associates

(57) ABSTRACT

A rotor of a motor apparatus may include: a shaft; a first core part including a first press-fit ring into which the shaft is press-fitted and a plurality of first cores arranged along the circumferential direction of the first press-fit ring so as to support magnets; a second core part including a plurality of second cores arranged along the circumferential direction of the shaft so as to face the first cores; and a third core arranged inside the second cores, and installed to support the first press-fit ring.

18 Claims, 8 Drawing Sheets

FIG. 7

|  | | | NOTE |
|---|---|---|---|
| Max torque | 1.7 Nm | | ENTIRE MOTOR TORQUE |
| NUMBER OF FIRST CORE PARTS | 14 | 10 | 6 | |
| MAXIMUM TORQUE [Nm] | 0.12 | 0.170 | 0.283 | THICKNESS 0.5mm |
| MAXIMUM STRESS OF PRESS-FITTED PART [MPa] | 5.182 | 7.271 | 12.07 | |

ROTOR OF MOTOR APPARATUS

CROSS-REFERENCES TO RELATED APPLICATION

The present application claims priority from and the benefit of Korean Patent Application No. 10-2017-0147161, filed on Nov. 7, 2017, which is hereby incorporated by reference for all purposes as if set forth herein.

BACKGROUND

Field

Exemplary embodiments relate to a rotor of a motor apparatus, and more particularly, to a rotor of a motor apparatus, which can prevent a first core part from being deformed by a press-fit force of a shaft and improve torque density.

Discussion of the Background

In general, a motor has a rotor installed in a stator, and a shaft is inserted into the rotation center of the rotor. When power is supplied to the stator, the rotor is rotated to generate a driving force.

A spoke-type motor includes a rotor having a structure in which a core and magnet are arranged along the circumferential direction of a shaft. Since the shaft made of a magnetic material is press-fitted into the core, a magnetic flux leaks through a connection between the core and the shaft. Since a plurality of magnetic flux leakage paths are formed along the shaft in the spoke-type motor, the magnetic flux leakage and a loss of torque density inevitably increase.

In order to reduce the magnetic flux leakage, an elongated magnetic bridge is installed between the core and the shaft. However, since the magnetic bridge occupies a large area in the radial direction of the rotor, it is difficult to apply the magnetic bridge to the spoke-type motor utilizing a ferrite permanent magnet and a motor having a hollow rotor.

Therefore, there is a demand for a device capable of solving such a problem.

The related art of the present invention is disclosed in Korean Patent Publication No. 2012-0110275 published on Oct. 10, 2012 and entitled "Spoke-type permanent magnet motor".

The above information disclosed in this Background section is only for enhancement of understanding of the background of the invention and, therefore, it may contain information that does not constitute prior art.

SUMMARY

Exemplary embodiments of the present invention provide a rotor of a motor apparatus, which can prevent a first core part from being deformed by a press-fit force of a shaft, and improve torque density.

In one embodiment, a rotor of a motor apparatus may include: a shaft; a first core part including a first press-fit ring into which the shaft is press-fitted and a plurality of first cores arranged along the circumferential direction of the first press-fit ring so as to support magnets; a second core part including a plurality of second cores arranged along the circumferential direction of the shaft so as to face the first cores; and a third core arranged inside the second cores, and installed to support the first press-fit ring.

The outer circumferential surface of the third core may be separated from inner ends of the second cores.

The third core may be formed in a circular ring shape to support the entire first press-fit ring.

The inner circumferential surface of the third core may be pressed against the outer circumferential surface of the shaft.

Each of the first cores may include: a first connection rib protruding in a radial direction from the outer circumferential surface of the first press-fit ring; and a first core body connected to the first connection rib and formed in a fan shape.

The first connection rib may form a magnetic flux leakage path through which magnetic flux generated by the rotor is transferred toward the shaft.

The first core body may have a first constraint protrusion formed at the outside thereof so as to constrain an outer corner of the magnet.

A first insertion restrictor may be formed at the connection between the first connection rib and the first core body, in order to constrain an inner corner of the magnet.

A distance between the first connection ribs adjacent to each other may be smaller than a distance between the first core bodies adjacent to each other.

The second core may be formed in a fan shape and arranged so as to face the first core, and the second core may have a second guide protrusion formed at the outside thereof, the second guide protrusion serving to guide the magnet when the magnet is assembled.

The second core may have a second push prevention protrusion formed at an inner end thereof, the second push prevention protrusion serving to prevent the inner end of the magnet from being pushed toward the first press-fit ring when the magnet is assembled.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

FIG. 7 is a table showing a torque per first core part and the maximum stress of a press-fitted part, depending on the number of first core parts in the rotor of the motor part in accordance with the embodiment of the present invention.

DETAILED DESCRIPTION OF THE ILLUSTRATED EMBODIMENTS

Figure 1:
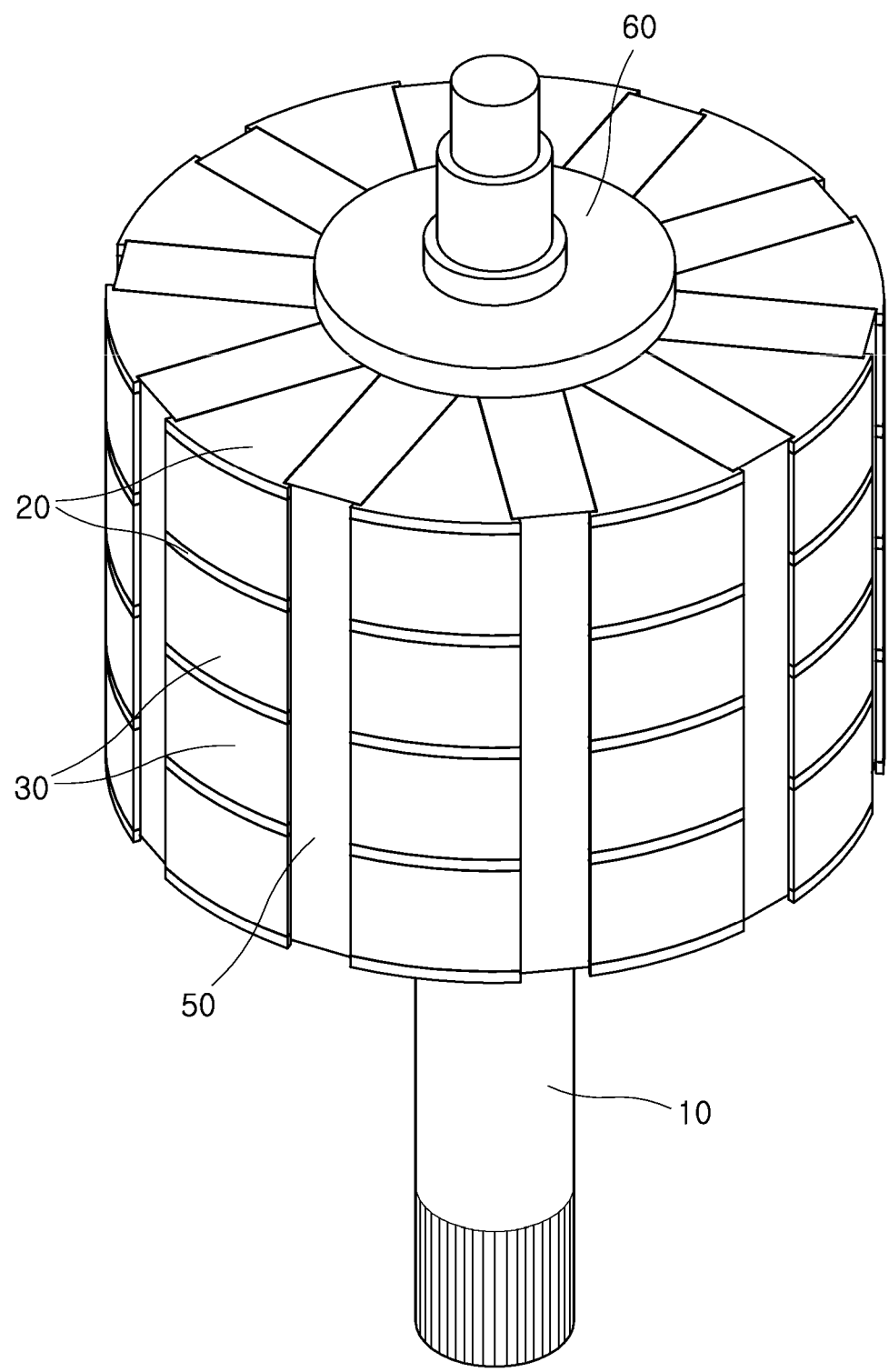
FIG. 1 is a perspective view illustrating a rotor of a motor apparatus in accordance with an embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. Like reference numerals in the drawings denote like elements.

Figure 2:
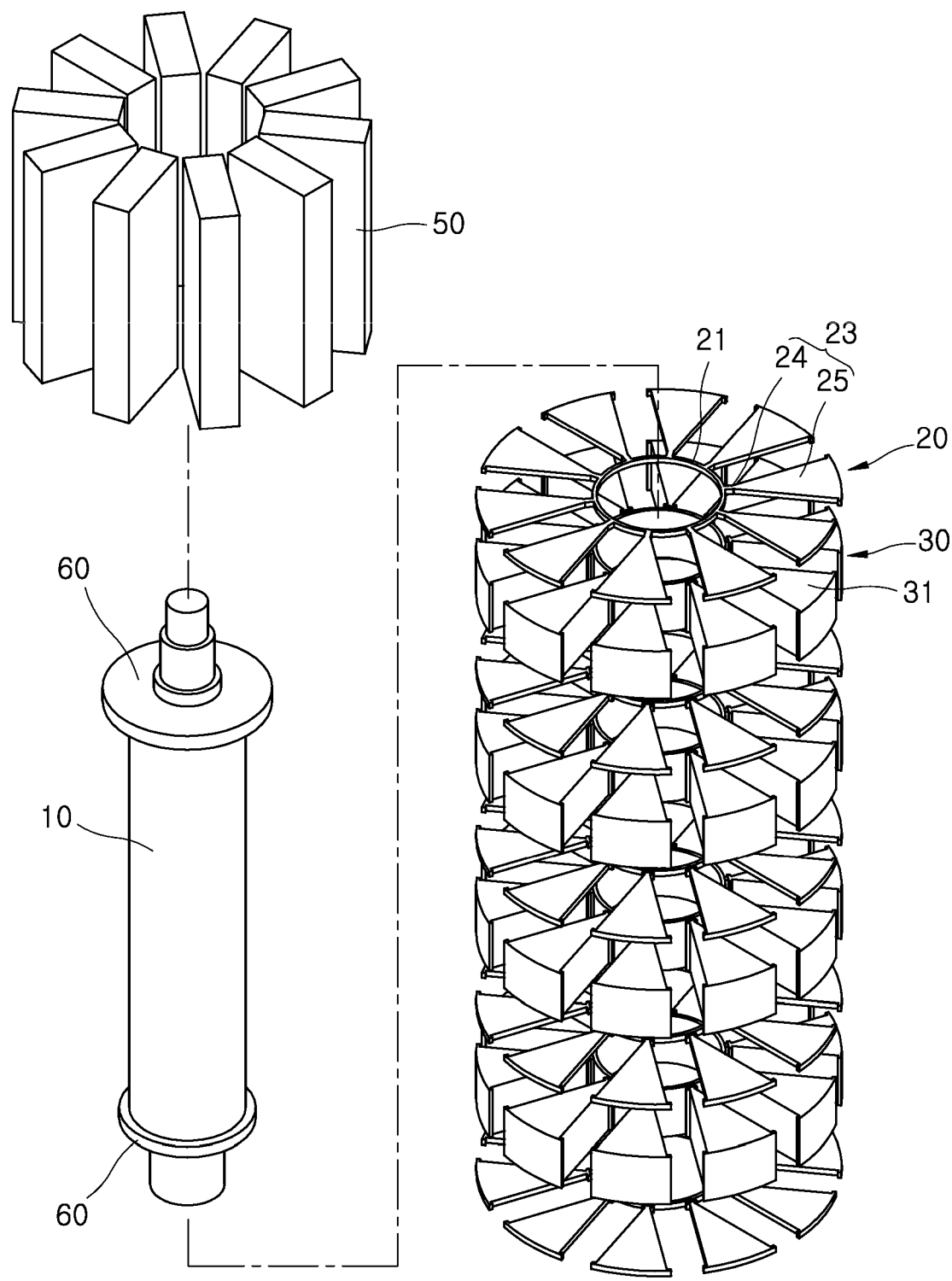
FIG. 2 is an exploded perspective view illustrating the rotor of the motor apparatus in accordance with the embodiment of the present invention.
Figure 3:
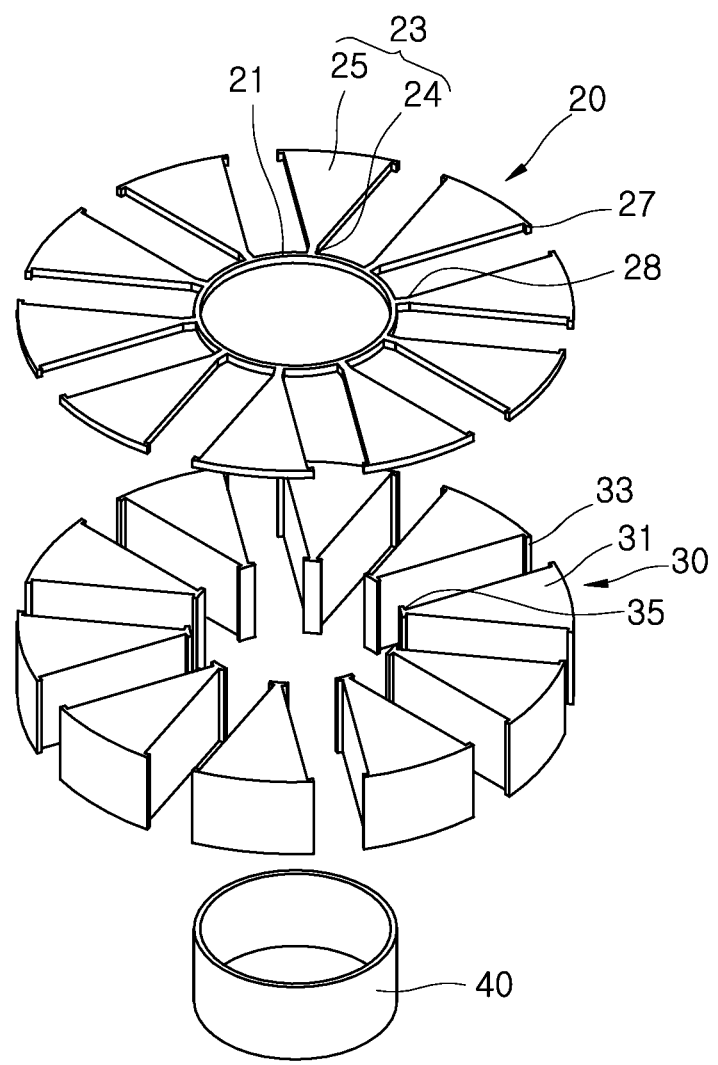
FIG. 3 is an exploded perspective view illustrating first to third core parts in the rotor of the motor apparatus in accordance with the embodiment of the present invention.
Figure 4A:
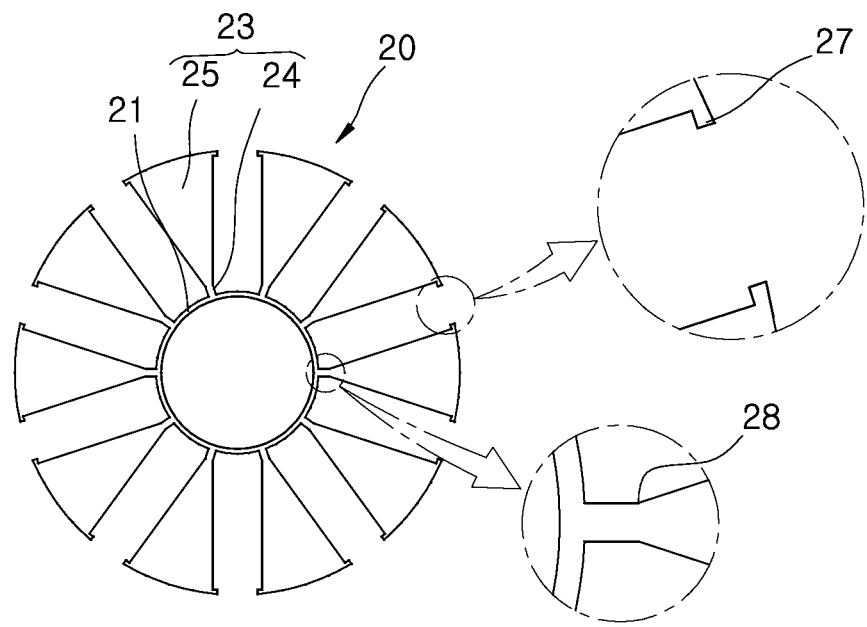
FIGS. 4A and 4B are plan views illustrating the first core part in the rotor of the motor apparatus in accordance with the embodiment of the present invention.
Figure 4B:
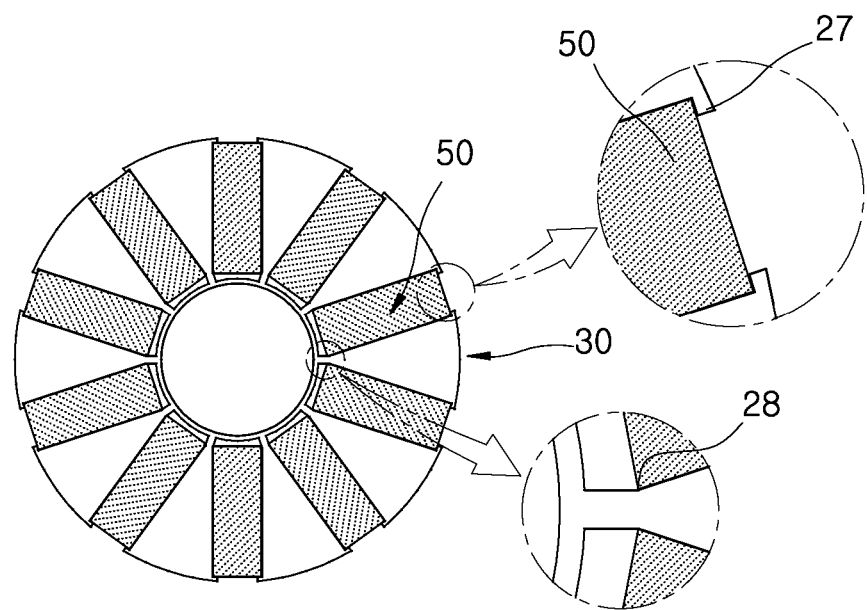
Figure 5A:
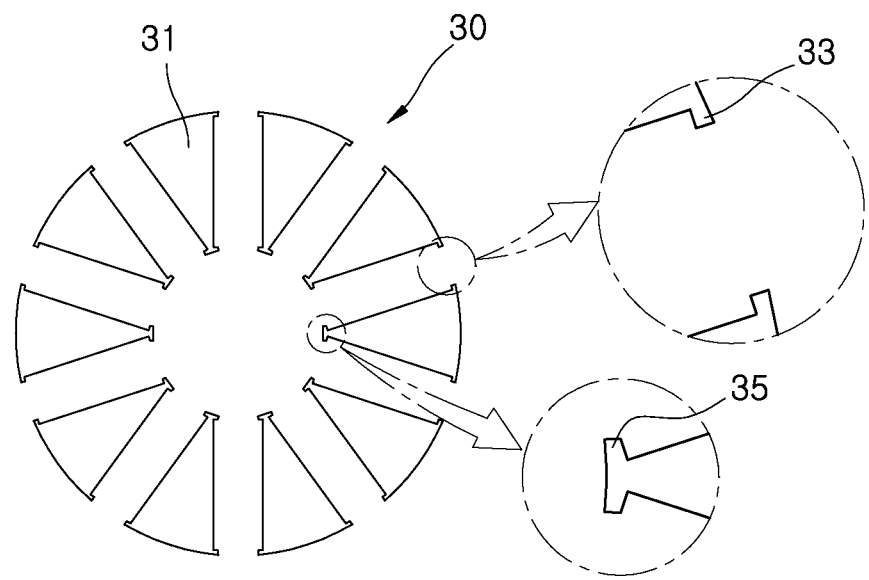
FIGS. 5A and 5B are plan views illustrating the second core part in the rotor of the motor apparatus in accordance with the embodiment of the present invention.
Figure 5B:
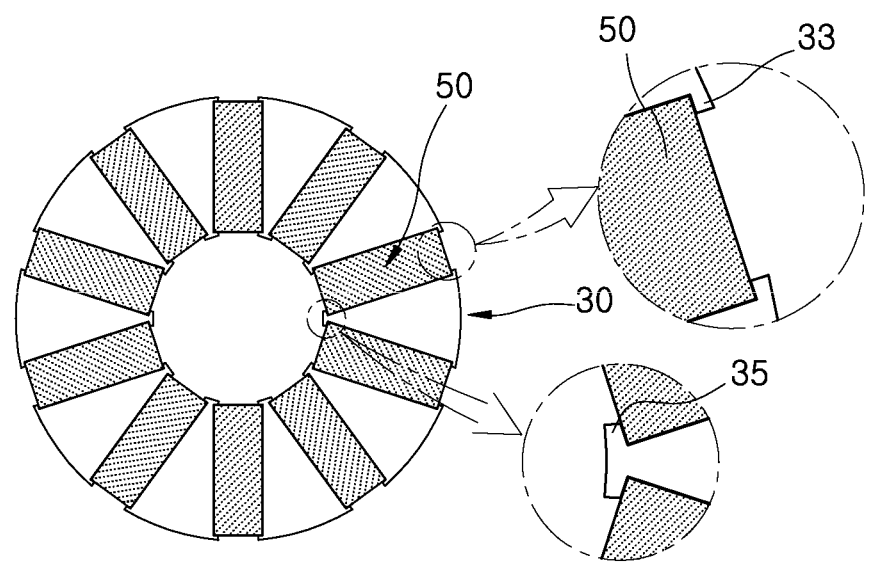
Figure 6:
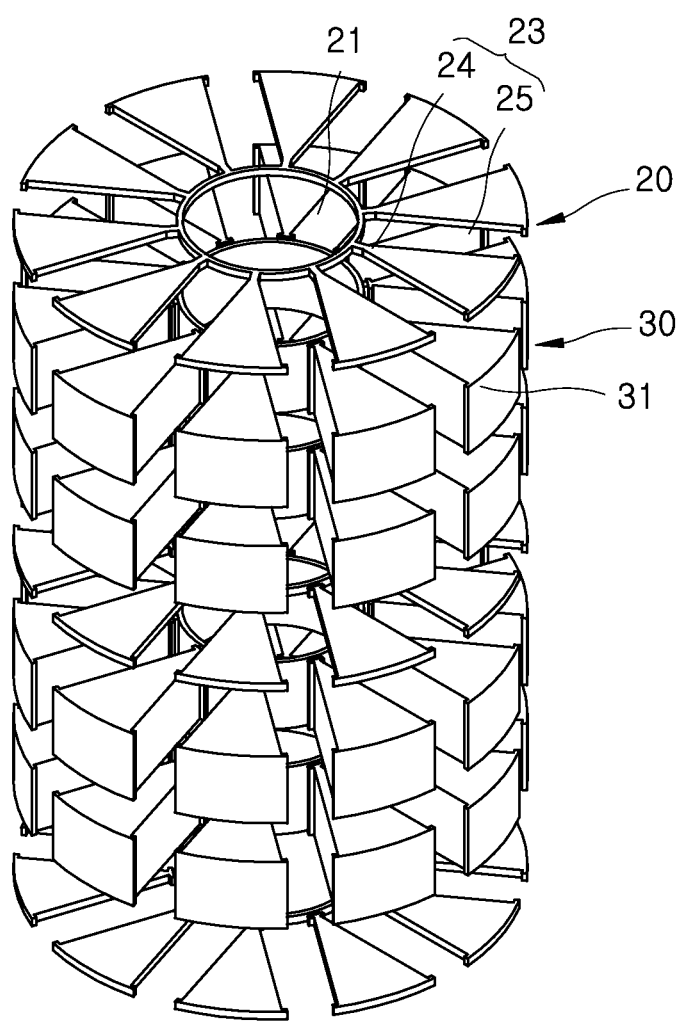
FIG. 6 is an exploded perspective view illustrating that the plurality of second core parts are installed between the respective first core parts in the rotor of the motor apparatus in accordance with the embodiment of the present invention.

FIG. 1 is a perspective view illustrating a rotor of a motor apparatus in accordance with an embodiment of the present invention, FIG. 2 is an exploded perspective view illustrating the rotor of the motor apparatus in accordance with the embodiment of the present invention, FIG. 3 is an exploded perspective view illustrating first to third core parts in the rotor of the motor apparatus in accordance with the embodiment of the present invention, FIGS. 4A and 4B are plan views illustrating the first core part in the rotor of the motor apparatus in accordance with the embodiment of the present invention, FIGS. 5A and 5B are plan views illustrating the second core part in the rotor of the motor apparatus in accordance with the embodiment of the present invention, and FIG. 6 is an exploded perspective view illustrating that the plurality of second core parts are installed between the respective first core parts in the rotor of the motor apparatus in accordance with the embodiment of the present invention.

Referring to FIGS. 1 to 6, the rotor of the motor apparatus in accordance with the embodiment of the present invention may include a shaft 10, a first core part 20, a second core part 30 and a third core 40.

The shaft 10 may be disposed at the rotation center of the rotor. The shaft 10 may be made of a magnetic material. Since the outer surface of the shaft 10 is subjected to a knurling process, the shaft 10 may have high surface roughness. Thus, the shaft 10 can prevented from slipping on the first core part 20.

The first core part 20 may include a press-fit ring 21 into which the shaft 10 is press-fitted and a plurality of first cores 23 arranged along the circumferential direction of the first press-fit ring 21 so as to support magnets 50.

The first press-fit ring 21 may be formed in a circular ring shape so as to be pressed against the outer circumferential surface of the shaft 10. The inner circumferential surface of the first press-fit ring 21 may be pressed against the outer circumferential surface of the shaft 10, and serve to transfer a driving torque of the rotor, formed through an electromagnetic force, to the shaft 10.

The plurality of first cores 23 may be arranged at even intervals on the circumference of the shaft 10. The first cores 23 may be formed in a fan shape, and the magnets 50 may be interposed between the respective first cores 23. The magnets 50 may be formed in a rectangular plate shape.

The second core part 30 may include a plurality of second cores 31 which are arranged along the circumferential direction of the shaft 10 while facing the respective first cores 23. The second cores 31 may be divided by a number corresponding to the number of poles in the motor apparatus.

The second core 31 may have a larger thickness than the first core 23. The second cores 31 may be arranged at even intervals on the circumference of the shaft 10, and correspond one-to-one to the first cores 23. The second cores 31 may be formed in a fan shape, and the magnet 50 may be interposed between the second cores 31.

The third core 40 may be installed inside the second cores 31 so as to support the first press-fit ring 21. The third core 40 may be formed in a circular ring shape to support the entire first press-fit ring 21. Since the third core 40 has the same inner diameter as the first press-fit ring 21, the inner diameter of the third core 40 and the inner diameter of the first press-fit ring 21 may successively form the press-fitted surface of the shaft 10. Since the third core 40 is installed to support the first press-fit ring 21, the first core part 20 can be prevented from being deformed when the shaft 10 is press-fitted into the first press-fit ring 21.

The outer circumferential surface of the third core 40 may be separated from the inner ends of the second cores 31. Since the third core 40 is separated from the second cores 31, magnetic fluxes generated from the second core part 30 can be prevented from leaking toward the third core 40. Therefore, it is possible to suppress a reduction in magnetic flux density of the rotor. Furthermore, since magnetic fluxes hardly leak through the third core 40, the third core 40 may have no influence on the entire size of the motor apparatus. That is, the third core 40 may facilitate the press-fitting of the shaft 10 while having almost no influence on the magnetic circuit of the motor apparatus.

Since leakage fluxes hardly leak through the second and third core parts 30 and 40, it is possible to manufacture a spoke-type motor utilizing a ferrite permanent magnet and a motor apparatus having a hollow rotor.

Since the outer circumferential surface of the third core 40 and the inner ends of the second cores 31 are separated from each other in order to prevent magnetic flux leakage, the third core 40 can be made of the same magnetic material as the first and second core parts 20 and 30. Furthermore, the third core 40 may be made of a non-magnetic material such as synthetic resin, stainless steel or aluminum.

The inner circumferential surface of the third core 40 may be pressed against the outer circumferential surface of the shaft 10. Since the inner circumferential surface of the third core 40 is pressed against the outer circumferential surface of the shaft 10, the third core 40 can be prevented from slipping on the outer circumferential surface of the shaft 10, when the rotor is rotated.

The rotor may have end plates 60 installed at both ends thereof in the axial direction. The end plate 60 may be formed in a circular ring shape. The end plate 60 may be made of a non-magnetic material such as aluminum. The end plate 60 may prevent the first to third core parts 20 to 40 and the magnets 50 from slipping or moving axially on the shaft 10. The end plate 60 may be press-fitted onto the shaft 10.

The first to third core parts 20 to 40 may be connected through an adhesive or an embossing structure. The magnets 50 may also be connected to the first and second core parts 20 and 30 through an adhesive.

The first core 23 may include a first connection rib 24 and a first core body 25. The first connection rib 24 may protrude in a radial direction from the outer circumferential surface of the first press-fit ring 21. The first core body 25 may be connected to the first connection rib 24, and formed in a fan shape.

The first connection rib 24 may form a magnetic flux leakage path through which magnet fluxes generated by the rotor are transferred toward the shaft 10. The first core part 20 may prevent the second core part 30 and the magnet 50 from slipping or moving in the direction of a centrifugal force, when the centrifugal force is generated by the rotor. When the rotor is rotated, the centrifugal forces of the second core part 30 and the magnet 50 may be transferred to the first core part 20. Therefore, since stress caused by the centrifugal forces is most concentrated on the first connection rib 24, the dimension of the first connection rib 24 may be decided through kinematic analysis on the concentrated stress.

The first core body 25 may have a first constraint protrusion 27 formed at the outside thereof, in order to constrain an outer corner of the magnet 50. The first constraint protrusion 27 may protrude toward the outer corner of the magnet 50. Since the first constraint protrusion 27 constrains the outer corner of the magnet 50, the magnet 50 can be prevented from slipping or moving in the direction of the centrifugal force of the rotor.

At the connection between the first connection rib 24 and the first core body 25, a first insertion restrictor 28 may be formed to constrain an inner corner of the magnet 50. At this time, the distance between the first connection ribs 24 adjacent to each other may be smaller than the distance between the first core bodies 25 adjacent to each other. Since the inner corner of the magnet 50 is locked to and constrained by the first insertion restrictor 28, the insertion depth of the magnet 50 may be limited in such a manner that the magnet 50 is locked to the first insertion restrictor 28 and prevented from entering inside, when the magnet 50 is inserted between the first cores 23. Therefore, the magnet 50 may be assembled at a predetermined radius from the shaft 10.

The first insertion restrictor 28 may be separated from the shaft 10 by a distance corresponding to the sum of the width of the first press-fit ring 21 and the length of the first connection rib 24. Therefore, the inner end of the magnet 50 may be separated from the shaft 10 by the first insertion restrictor 28.

The second core 31 may be formed in a fan shape so as to face the first core 23, and have a second guide protrusion 33 formed at the outside thereof, the second guide protrusion 33 serving to guide the magnet 50 when the magnet 50 is assembled. The second guide protrusion 33 may protrude toward an outer corner of the magnet 50. Therefore, when the second core 31 and the magnet 50 are pushed toward the shaft 10 with the magnet 50 disposed between the second cores 31, the outer corner of the magnet 50 may be locked to the second guide protrusion 33 and assembled to the second core 31. Furthermore, the second guide protrusion 33 may prevent the magnet 50 from slipping or moved in the centrifugal force direction when the rotor is rotated.

The second core 31 may have a second push prevention protrusion 35 formed at the inner end thereof, the second push prevention protrusion 35 serving to prevent the inner end of the magnet 50 from being pushed toward the first press-fit ring 21, when the magnet 50 is assembled. Therefore, the magnet 50 may be assembled at a predetermined radius from the shaft 10.

The second core parts 30 and the first core parts 20 may be alternately laminated (refer to FIG. 2). In this case, since the number of first core parts 20 press-fitted onto the shaft 10 is increased, the maximum stress of the motor apparatus may be increased when the rotor is rotated.

Furthermore, the plurality of second core parts 30 may be laminated between the respective first core parts 20 (refer to FIG. 6). Since the thickness of the second core part 30 between the first core parts 20 adjacent to each other is relatively increased, the torque of the motor apparatus may be relatively increased when the rotor is rotated. As the proportion of the second core parts 30 in the entire rotor is increased, the torque density and the magnetic flux density may be relatively increased.

The number of first core parts 20 laminated in the rotor may be decided through the following torque and stress analysis.

Figure 8:
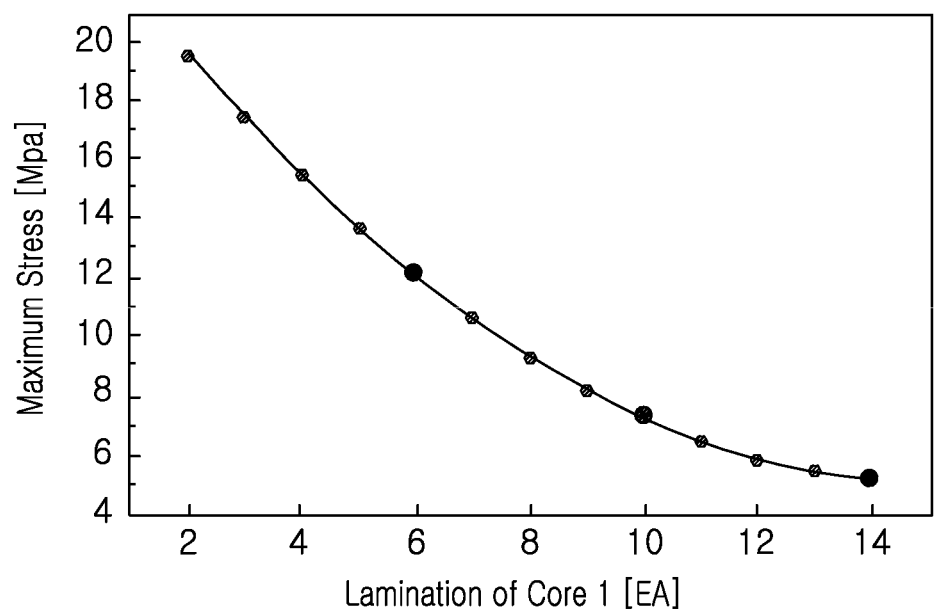
FIG. 8 is a graph illustrating the maximum stress of the press-fitted part for each number of first core parts in the rotor of the motor apparatus in accordance with the embodiment of the present invention.

FIG. 7 is a table showing a torque per first core part and the maximum stress of the press-fitted part, depending on the number of first core parts in the rotor of the motor part in accordance with the embodiment of the present invention, and FIG. 8 is a graph illustrating the maximum stress of the press-fitted part for each number of first core parts in the rotor of the motor apparatus in accordance with the embodiment of the present invention.

Referring to FIGS. 7 and 8, when the maximum torque of the motor apparatus is 1.7 Nm and the motor apparatus includes 14 first core parts 20 installed therein, the torque of each of the first core parts 20 is 0.121 Nm (1.7/14), and the maximum stress of the first press-fit ring 21 is 5.182 MPa.

Furthermore, when the maximum torque of the motor apparatus is 1.7 Nm and the motor apparatus includes 10 first core parts 20 installed therein, the torque of each of the first core parts 20 is 0.170 Nm (1.7/10), and the maximum stress of the first press-fit ring 21 is 7.271 MPa.

Furthermore, when the maximum torque of the motor apparatus is 1.7 Nm and the motor apparatus includes 6 first core parts 20 installed therein, the torque of each of the first core parts 20 is 0.283 Nm (1.7/6), and the maximum stress of the first press-fit ring 21 is 12.07 MPa.

Since the torque and the maximum stress are increased as the installation number of first core parts 20 is increased, the installation number of first core parts 20 may be appropriately designed in consideration of the size or characteristic of the motor apparatus.

In accordance with the embodiment of the present invention, since the third core is installed to support the first press-fit ring, the first core part can be prevented from being deformed when the shaft is press-fitted into the first press-fit ring.

Furthermore, since the third core is separated from the second cores, magnetic fluxes generated by the second core part can prevented from leaking toward the third core part. Therefore, it is possible to suppress a reduction in magnetic flux density of the rotor.

Although preferred embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. A rotor of a motor apparatus, comprising:
   a shaft;
   a first press-fit ring, wherein the shaft is press-fitted into the first press-fit ring,
   a plurality of first cores arranged along a circumferential direction of the first press-fit ring to support magnets, the first plurality of cores having the first thickness;
   a plurality of second cores arranged along the circumferential direction of the shaft to face the plurality of first cores, the second plurality of cores having a second thickness larger than the first thickness; and
   a plurality of third cores arranged inside and connecting to all of the plurality of second cores, and installed to support the first press-fit ring.

2. The rotor of claim 1, wherein outer circumferential surfaces of the plurality of third cores are separated from inner ends of the plurality of second cores.

3. The rotor of claim 2, wherein the plurality of third cores are formed in a circular ring shape to support a plurality of first press-fit rings.

4. The rotor of claim 3, wherein inner circumferential surfaces of the third cores are pressed against an outer circumferential surface of the shaft.

5. The rotor of claim 1, wherein the plurality of first cores comprises:
   a plurality of first connection ribs protruding in a radial direction from an outer circumferential surface of the first press-fit ring; and
   a plurality of first core bodies connected to the plurality of first connection ribs, and each of the plurality of first core bodies is formed in a fan shape.

6. The rotor of claim 5, wherein each of the plurality of first connection ribs forms a magnetic flux leakage path through which magnetic flux generated by the rotor is transferred toward the shaft.

7. The rotor of claim 5, wherein each of the plurality of first core bodies has a first constraint protrusion formed at an outside of the first core body to constrain an outer corner of the magnets.

8. The rotor of claim 5, wherein a plurality of first insertion restrictor are formed at a connection between each of the plurality of first connection ribs and each of the plurality of first core bodies, in order to constrain an inner corner of the magnets.

9. The rotor of claim 8, wherein a distance between adjacent two of the plurality of first connection ribs is smaller than a distance between adjacent two of the plurality of first core bodies.

10. The rotor of claim 5, wherein each of the plurality of second cores are formed in a fan shape and arranged to face each of the plurality of first cores, and
    each of the plurality of second cores has a second guide protrusion formed at an outside of each of the plurality of second cores, the second guide protrusion serving to guide the magnets when the magnets are assembled.

11. The rotor of claim 10, wherein each of the plurality of second cores has a second push prevention protrusion formed at an inner end of each of the plurality of second cores, the second push prevention protrusion serving to prevent inner ends of the magnets from being pushed toward the first press-fit ring when the magnets are assembled.

12. The rotor of claim 1, wherein the first press ring has the first thickness.

13. The rotor of claim 12, wherein each of the plurality of first cores is attached to a first press ring.

14. The rotor of claim 1, wherein the plurality of third cores have substantially a same thickness as the plurality of second cores.

15. The rotor of claim 1, wherein the plurality of first cores and plurality of second cores are alternately laminated.

16. The rotor of claim 1, wherein a plurality of first press rings and a plurality of third cores are alternately laminated.

17. The rotor of claim 1, wherein a plurality of second cores are laminated between single first cores.

18. The rotor of claim 1, wherein the plurality of third cores are laminated between single first press rings.

* * * * *